INVENTORS
GEORGE S. SOMEKH
EDWARD N. HAWKES
ATTORNEY

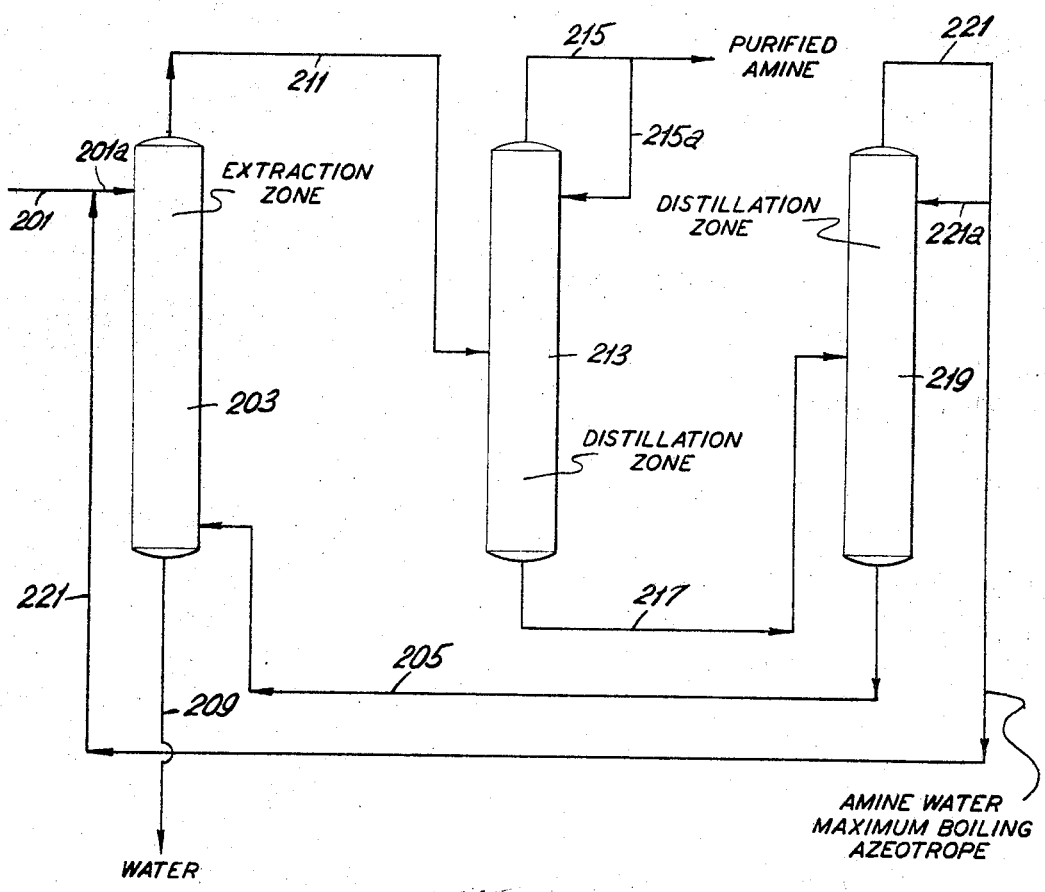

United States Patent Office 3,433,788
Patented Mar. 18, 1969

3,433,788
PROCESS FOR RECOVERY OF AMINES FROM AQUEOUS SOLUTIONS BY SOLVENT TREATMENT AND DISTILLATION
George S. Somekh, New Rochelle, and Edward N. Hawkes, White Plains, N.Y., assignors to Union Carbide Corporation, a corporation of New York
Continuation-in-part of application Ser. No. 517,504, Dec. 14, 1965, which is a continuation of application Ser. No. 200,393, June 6, 1962. This application Apr. 27, 1966, Ser. No. 545,713
U.S. Cl. 260—247                        23 Claims
Int. Cl. C07d 87/50; B01d 11/00

ABSTRACT OF THE DISCLOSURE

An aqueous mixture of an amino group containing compound such as morpholine or ethylene diamine is concentrated by a combined extraction and distillation treatment with a solvent-entrainer material that is immiscible with water, chemically inert to and higher boiling than the amine. The extract phase from the extraction is distilled, usually in the form of a water-entrainer azeotrope and the amine is recovered as a separate stream.

---

This is a continuation-in-part of our application Ser. No. 517,504, filed Dec. 14, 1965, and now abandoned and which is in turn a continuation of our application Ser. No. 200,393, filed June 6, 1962, and now abandoned.

This invention relates in general to a process for recovering water soluble amino group-containing organic compounds from aqueous solutions thereof. It is particularly related to a process for the recovery of water soluble amines from aqueous solutions of the same by solvent extraction and distillation. In one particular aspect, the present invention is directed to a process for the recovery of morpholines from their aqueous solutions.

Due to the existence of strong bonding between the amino functional group and water, it has heretofore been difficult to recover amines from their aqueous solutions in good yields. For example, processes for the recovery of morpholines from their aqueous solutions by distillation technique have not been practical. The strong bonding between morpholine and water appears to result in a nonideal system which hinders separation and necessitates the use of a large and costly distillation column. Moreover, since morpholines as well as some of the other amines boil at higher temperatures than water, separation by distillation involves complete vaporization of the water present. This of course requires the use of enormous amounts of heat, steam and cooling water. Furthermore, the N-alkyl morpholines as well as some of the other amines form azeotropes with water which cannot be separated by ordinary distillation.

In order to obviate the difficulties encountered in the distillation operation, some of the prior art processes have employed extraction procedures. One such process resorts to the use of a concentrated solution of sodium hydroxide to dewater an aqueous solution containing a morpholine. In this process morpholine containing some water is obtained as raffinate and requires further purification. However, the major disadvantage of this process is to regenerate the concentrated sodium hydroxide solution for reuse. Here again, large amounts of water must be removed by distillation which is, as was previously indicated, costly and undesirable.

Another prior art process utilizes ethyl ether to extract a morpholine from its aqueous solution. However, this process is extremely inefficient and costly due to high solvent losses resulting from the volatility of ethyl ether. Further disadvantages of this process are the necessity of employing a series of distillation steps in order to obtain high yields of morpholine in high purity and the necessity for complete vaporization of the ether.

It is therefore an object of this invention to provide a novel process for the recovery of amino group-containing compounds from their aqueous solutions.

It is another object of this invention to provide a process for the recovery of amines from aqueous solutions thereof which process involves a combination of extractive and distillative operations.

It is a further object of this invention to recover a morpholine from an aqueous solution containing the same by a process which does not involve costly distillation of large amounts of water.

These and other objects of the present invention will become apparent from a consideration of the following specification and drawings.

The aforesaid objects of this invention are accomplished by a novel process which comprises contacting an aqueous feed containing the amine (or the amino group-containing compound) with an inert, water-immiscible, selective liquid organic solvent at an elevated temperature in a contacting zone, withdrawing an extract containing said amine and subsequently recovering the amine from the extract by distillation. Generally, the aqueous solution of the amine and the solvent are introduced into an extraction zone, preferably in a countercurrent fashion usually at elevated temperatures. The organic solvent dissolves the amine to yield an extract which contains the solvent, the amine and a small amount of water. The raffinate from the extraction zone contains the major portion of the water from the aqueous feed and may be discarded. The extract is then subjected to a distillative operation where the water is usually removed initially. The dewatered extract is thereafter further distilled to recover the amine from the solvent.

The novel process is suitably adapted for the recovery of any water-soluble organic compound from its aqueous solution provided that said organic compound contains at least one amino group in its molecular structure. Thus the term "amino group-containing compounds" has reference to such organic compounds which contain at least one substituted or unsubstituted amino functionality.

The process of this invention is readily adaptable for the recovery of the following amines from their aqueous solutions: primary amines represented by the general formula $R_1NH_2$; secondary amines conforming to the general formula

tertiary amines having the general formula

wherein $R_1$, $R_2$, $R_3$, $R_4$, $R_5$ and $R_6$ in said amines each designates an alkyl group containing 1 to 5 carbon atoms, preferably 2 to 5 carbon atoms, aryl group, alkaryl or aralkyl group.

Exemplary primary amines which are suitable in the practice of this invention are n-propylamine and n-butylamine; methyl-n-propylamine and diethylamine exemplify the secondary amines which can be employed in the process of this invention while the tertiary amines can be exemplified by methyl diethylamine and triethylamine.

Other amines for which the present invention is suitable include, alkylenediamines, alkylenepolyamines, alkanolamines, hydrazines, imidazoles, quinoline, pyrrole, pyrrolidone, aniline, benzylamine, alkylamines etc.

The novel process is particularly suitable for the recovery of water soluble morpholines from their aqueous solutions. The term "morpholine" is intended to encompass morpholines, N-alkylmorpholines and other alkyl-substituted morpholines. The N-alkylmorpholines contemplated herein are morpholines having a straight or branched chain alkyl substituent on the nitrogen atom. These include N-methylmorpholine, N-ethylmorpholine, N-propylmorpholine, N-isopropylmorpholine, N-butylmorpholines, N-pentylmorpholines, N-hexylmorpholines N-heptylmorpholines, N-octylmorpholines, N-nonylmorpholines, N-decamorpholines, and the like.

The instant process is equally adapted for the recovery of mixtures of the above-mentioned amines. Thus, the aqueous solution which is fed to the extraction zone may contain more than one of the foregoing amines. It should be once again pointed out however that the process of this invention is generally adapted for the recovery of any amino group-containing compound from its aqueous solution.

The extraction operation may be carried out over a relatively wide temperature range. The optimum extraction temperature for any particular system is determined by the specific amine and the solvent as well as the properties of the specific components and their response to temperature increase. In general, it has been found that the extractive capacity of the organic solvent tends to increase with an increase in temperature thus resulting in a higher concentration of the amine in the extract. Generally, the extraction step can be effected at a temperature as low as about 25° C. to as high as about 300° C., preferably from about 50° C. to about 200° C. Furthermore, the selected extraction temperature must be above the freezing points or pour points of the materials in the extraction zone in order to insure ready flow of all process materials therein.

Subsequent distillation of the extract is preferably effected at substantially the same temperature as the extraction operation, though somewhat higher temperatures may be employed if necessary. This practice minimizes the heat requirements of the process.

The pressure in the extraction zone can vary depending upon the same factors and considerations upon which the selection of the extraction temperature were based. Generally, this pressure can vary from about 10 p.s.i.a. to about 165 p.s.i.a., preferably from about 15 p.s.i.a. to about 30 p.s.i.a. Once again the optimum pressure is ascertainable by those skilled in the art in the light of the foregoing considerations Similarly, the pressure in the subsequent distillation steps can vary depending upon the specific materials which are being distilled. The distillation pressure generally varies from about 0 millimeter of mercury to about 760 millimeters of mercury, preferably from about 10 millimeters of mercury to about 250 millimeters of mercury.

The selective solvents which can be employed in the practice of this invention must possess certain critical properties. The solvent must be a liquid organic vehicle which is essentially immiscible with water and is inert to the amino group-containing compound. It must furthermore have a higher boiling point than the amino group-containing compound being recovered. In fact, it is desirable that the solvent have sufficiently higher boiling point to permit ready separation of the components by fractional distillation. Generally, it is preferable that the boiling point of the solvent be at least 10° C. higher than the boiling point of the amino group-containing compound which is being recovered in order to facilitate their separation by fractional distillation. In addition, the solvent must be incapable of forming a binary azeotrope with said amino group-containing compounds at the distillation conditions employed herein in the fractional distillation operation.

Another critical requirement with respect to the solvents which are employed in the practice of this invention relates to the distribution coefficient of the amino group-containing compound. The distribution coefficient is employed herein in its generally known context. It refers to the ratio of the concentration of the amino group-containing compound in the solvent to that in water. It has been found that from practical and economical standpoint the selected solvent must be such that the resulting distribution coefficient of said amino group-containing compound is at least about $\frac{1}{20}$, preferably at least about $\frac{1}{10}$. The concentration of the materials are expressed herein on weight basis. Thus a distribution coefficient of $\frac{1}{20}$ indicates that one part by weight of the amino group-containing compound is in the solvent and 20 parts by weight are found in the water.

Solvents which possess the foregoing critical properties are: saturated aliphatic alcohols such as 2-ethylbutanol, 2-methyl-1-pentanol, 4-methyl - 2 - pentanol, 2,2,4-trimethyl-1-pentanol, n-hexanol, 2-ethylhexanol, n-heptanol, sec-octanol, n-octanol, 2-nonanol, n-decanol, isodecanol, undecanol, 2,6,8-trimethyl-4-nonanol etc. Saturated aliphatic alcohols which contain 6 to 12 carbon atoms are preferred.

Other suitable solvents include saturated aliphatic hydrocarbons such as, for example, nonane, decane, undecane, dodecane, tridecane, and isomers thereof; alkyl alkonates such as 2-ethylhexyl acetate, amyl acetate, 4-methyl-2-pentylacetate, etc.; aromatic hydrocarbon solvents, i.e., alkyl substituted benzenes such as o-xylene, m-xylene, p-xylene, mesitylene, isopropylbenzene, etc.; saturated ketones such as methyl-n-amyl ketone, methyl isoamyl ketone, isobutylheptyl ketone, etc.; ester derivatives of ethylene and diethylene glycol such as butyl Cellosolve acetate, butyl Carbitol acetate, dibutyl Carbitol and the like; halogenated aliphatic hydrocarbons such as 1,1,2,2,-tetrachloroethane, pentachloroethane and 2-ethylhexyl chloride; halogenated aromatic hydrocarbons such as, for example, chlorobenzene, ortho-dichlorobenzene and meta-fluorotoluene; and aromatic alcohols such as the alkyl phenols, benzyl alcohol, nonyl phenol, ortho cresol, etc.

It should be mentioned at this point that some of the solvents which are employed in the practice of this invention are lighter than water (density less than 1) while there are other suitable solvents which are heavier than water (density greater than 1). For example, penta-chloroethane is heavier than water while 2-ethylhexyl chloride and meta-fluorotoluene are both lighter than water. While the invention described herein is illustrated in the drawings for solvents which are lighter than water (and the aqueous amine solution), it is to be understood, however, that when the solvent employed is heavier than water (and the aqueous amine solution) the solvent in such instance should be introduced to the top and the aqueous amine solution introduced to the bottom of the extraction zone. Such modification is well within the scope of the present invention and is obvious to those skilled in the art.

Still another group of solvents which can be satisfactorily employed in the process of this invention include methyl benzoate, isophorone, alkyl phosphoric acids and alkyl carboxylic acids, alkyl ethers and alkyl amines.

The present invention will be more clearly understood in connection with the accompanying drawings wherein:

FIGURE 4 is still another schematic flow diagram representing a further embodiment of the present invention.

With reference to the ternary miscibility diagram (FIGURE 1) it should be stated that a study of such a diagram perhaps represents a realistic method for the evaluation of the solvents which are useful in the instant process. From an analysis of ternary miscibility data such vital solvent properties as the mutual insolubility of the solvent and water, the capacity of the solvent for the amine (morpholine) the effect of temperature on the capacity of the solvent may be readily determined. While the ternary miscibility diagram of FIGURE 1 relates to morpholine, similar diagrams can be constructed for all amines. The miscibility curve in FIGURE 1 should be such as to indicate a substantial immiscibility of the solvent and water. Furthermore, the tie lines should show a sufficient capacity of the solvent for morpholine (or amine).

In addition to evaluation of the solvent by reference to the ternary miscibility diagram, a relatively simple and quick test is recommended to determine the distribution coefficient of the amines to be extracted. This test comprises charging the aqueous solution of the amine and the solvent to a separatory funnel, shaking thoroughly for several minutes and allowing the phases to separate, and thereafter determining the relative concentration of the amine in the two phases. This simple and quick method gives an initial indication of the suitability of the solvent from practical standpoint, i.e., whether or not the distribution coefficient of the amine is within the desired range. Accordingly, it is obvious to one skilled in the art, in the light of the instant disclosure, to readily determine the solvent which is most suitable for any particular extraction system.

Figure 1:
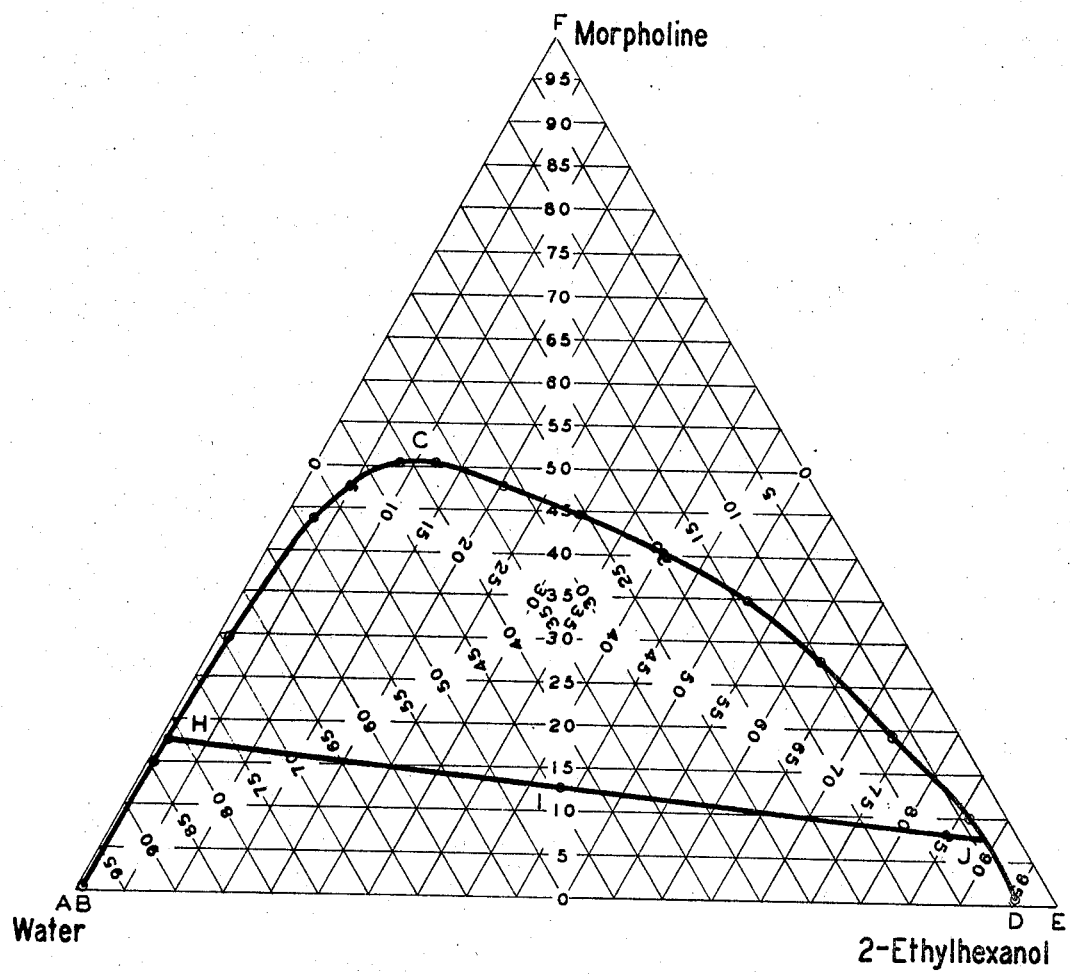
FIGURE 1 is a ternary miscibility equilibrium diagram for 2-ethylhexanol-morpholine-water system at 85° C. and atmospheric pressure.

Now specifically referring to FIGURE 1, the vertices of the triangle in the diagram, i.e., points A, E and F represent pure components. Any point on any one side of the triangle represents a binary system, while any point within the triangle designates a ternary mixture. The binodal curve BHCJD is the dividing line between one phase and two phase mixtures at the given temperature. A ternary mixture which is represented by a point lying above the curve consists of a single continuous liquid phase, whereas a mixture lying under the curve consists of two phases at the specific temperature. When a tie line, the slope of which is determined experimentally, is drawn through a point representing a mixture in the two phase region, it will intersect the binodal curve at two points, representing the compositions of each of the two phases. For example if point I represents a specific ternary mixture, and line HIJ is the experimentally determined tie line through that point, then the compositions of the two phases are represented respectively by point H which corresponds to the water-laden phase, and point J corresponds to the solvent rich phase.

Figure 2:
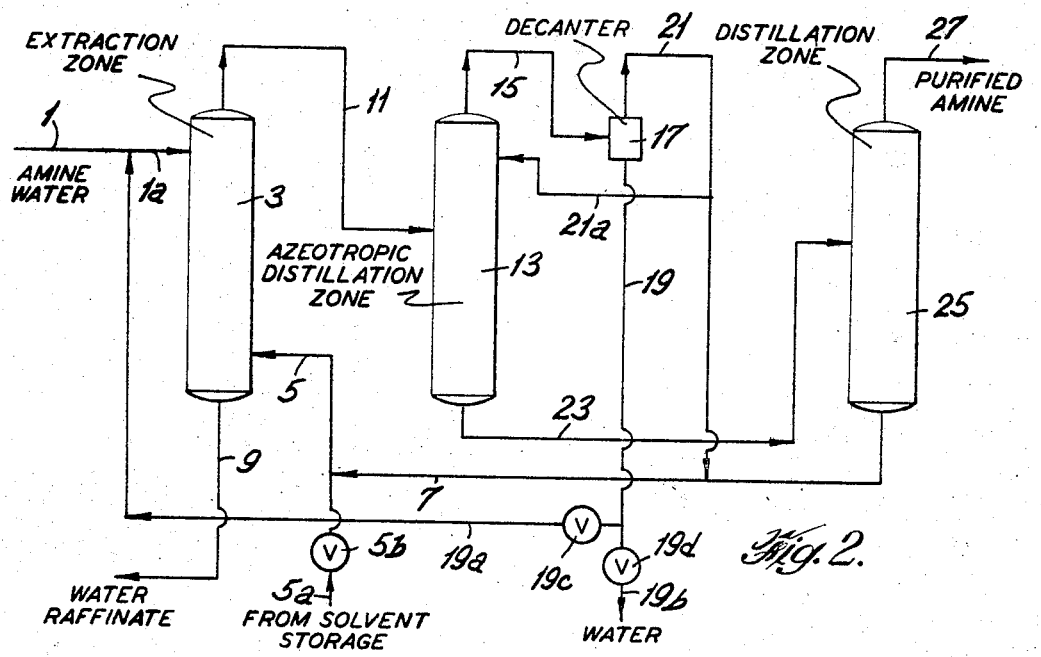
FIGURE 2 is a schematic flow diagram which is illustrative of one embodiment of this invention.

Referring now to the schematic flow diagram in FIGURE 2, the aqueous solution of the amine is introduced through lines 1 and 1a to an extraction zone 3 wherein it is countercurrently contacted with the solvent which enters the extraction zone via line 5. Initially, the extraction column is started by introducing the solvent through line 5a which is connected to a solvent storage vessel (not shown). Once the system is on stream, the solvent will be introduced to the extraction zone through recycle line 7 as will hereinafter be explained. Make-up solvent can be introduced via line 5a by opening and closing valve 5b as it becomes necessary.

The raffinate from the extraction zone which primarily contains water is withdrawn via line 9 and is normally discarded. The extract which comprises essentially solvent, amine and some water is introduced via line 11 into a distillation zone 13 wherein the extract is subjected to azeotropic distillation. A solvent-water azeotrope or a solvent-water-amine azeotrope is removed overhead from distillation zone 13 via line 15 which after condensation enters a decanter 17 wherein the azeotrope is broken thus separating into a lower water layer and upper layer consisting essentially of the solvent. The lower water layer is withdrawn from the decanter via line 19, either recycled to the extraction zone via line 19a which joins the aqueous amine feed line 1, or it is discarded via line 19b. This layer is generally recycled if it contains some amine. Valves 19c and 19d are opened and closed so as to direct the flow of the lower water layer as may be desired. The upper layer from the decanter is withdrawn via line 21 and is recycled to extraction zone 3 after joining line 7 as shown in FIGURE 2. The distillation zone 13 is operated under reflux (line 21a).

The bottom from distillation zone 13 is withdrawn via line 23 and is introduced into a second distillation zone 25. This stream which consists essentially of the solvent and the amine is subjected to fractional distillation whereby purified amine is recovered overhead via line 27. The bottom from distillation zone 25 consists essentially of the solvent and is recycled to the extraction zone via line 7.

It should be noted that in the process of the present invention the bottoms from distillation zone 13 will always contain some amine. This stream is subsequently distilled to be recover purified amine as mentioned previously. It is possible, of course, that under certain instances this bottoms stream will be free of amine. Such is the case when a ternary azeotrope of solvent-water and amine is distilled in distillation zone 13 and there are no additional quantities of amine (in addition to the quantity required for the formation of ternary azeotrope in distillation zone 13) in the feed. It could be appreciated however, that the amine in this latter instance will be recovered as a ternary azeotrope with water and solvent but not as purified amine.

The schematic diagram illustrated by FIGURE 2 represents one embodiment of the invention wherein the extracting solvent has a higher boiling point than the amine to be recovered and forms a minimum-boiling heterogeneous binary azeotrope with water, or it forms a minimum-boiling ternary azeotrope with water and amine. In a different variation of the embodiment shown in FIGURE 2, a low-boiling hydrocarbon (lower boiling than the amine to be recovered) is used along with the solvent in the extraction zone. The low boiling hydrocarbon can be any saturated aliphatic or any aromatic compound of the type previously described in connection with the description of the solvent. This variation is diagrammatically illustrated in FIGURE 3 which is essentially similar to the process described in connection with FIGURE 2. Thus referring specifically to FIGURE 3, the aqueous solution of the amine is introduced via lines 101 and 101a into an extraction zone 103 wherein it is countercurrently contacted with the solvent. In this context, the solvent will be referred to as "high-boiling solvent" so as to distinguish the same from the "low-boiling solvent," i.e., the low-boiling hydrocarbon. The extraction column may initially be started as described previously in connection with FIGURE 2. The low-boiling solvent can be initially introduced through line 6. After the system has attained operational equilibrium, the low-boiling solvent is provided as a process stream and thus valve 6a can be closed. The low-boiling solvent can be introduced into the extraction zone through line 5 along with the high-boiling solvent, in which case valve 5c is opened and valve 121a is closed. Preferably however, the low-boiling solvent is introduced at a point below the entry point of the high-boiling solvent in the extraction zone in which case valve 121a is opened and valve 5c will be closed. In the latter and preferred method of operation, the low-boiling solvent will percolate upwardly through the extraction zone and thus remove entrained and dissolved high-boiling solvent from the water phase in the lower section of the extraction zone so that the raffinate leaving via line 109 contains minimum amount of solvent.

Figure 3:
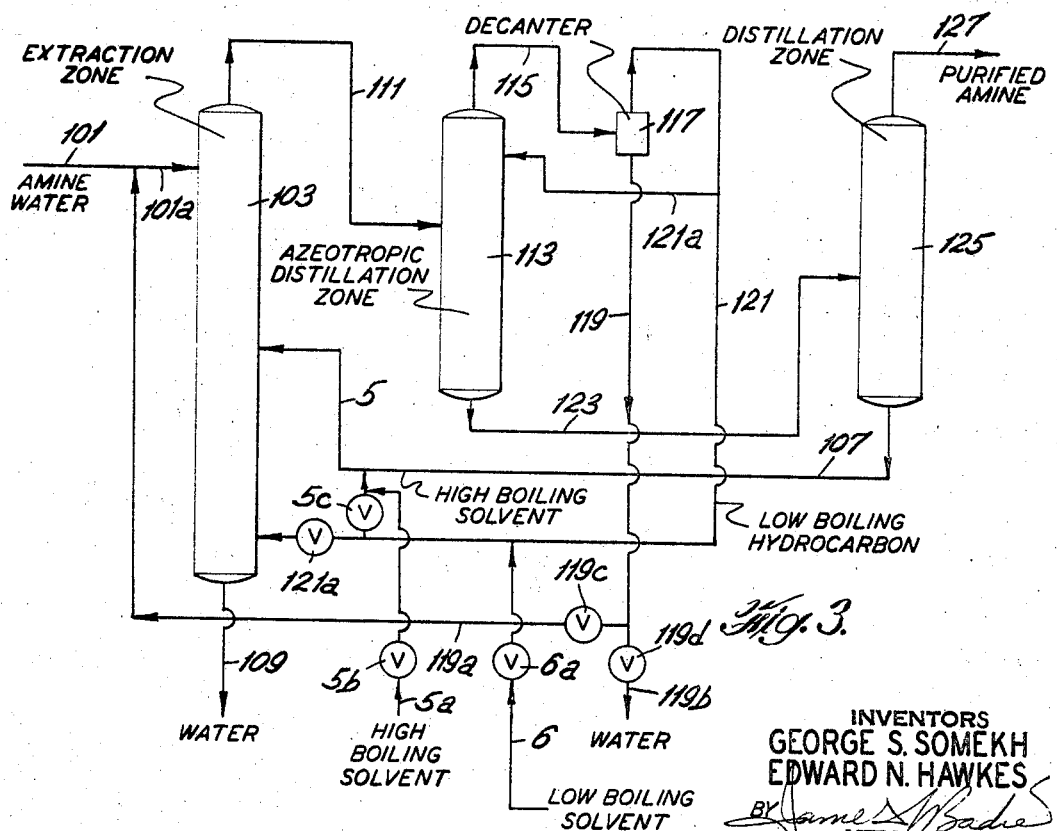
FIGURE 3 is another schematic flow diagram illustrating a different embodiment of the process of this invention.

The extract is withdrawn from the extraction zone through line 111 and is introduced into a distillation zone 113. The extract which consists essentially of both solvents, amine and some water is subjected to azeotropic distillative operation in this distillation zone. An overhead is removed via line 115 consisting of a minimum-boiling heterogeneous azeotrope of water and the low-boiling solvent. This is condensed and introduced into a decanter 117 wherein the azeotrope is broken thus separating into a lower layer of water which is withdrawn via line 119 and is either discarded or recycled as in FIGURE 2; and an upper layer consisting essentially of the low-boiling solvent which is withdrawn from the decanter via line 121 which is recycled to the extraction zone as shown in FIGURE 3. A reflux stream 121a is provided for azeotropic distillation zone 113.

The bottom from the azeotropic distillation zone 113 is withdrawn via line 123 and is introduced into a second distillation zone 125. This stream which consists essentially of the amine and the high-boiling solvent is subjected to fractional distillation in distillation zone 125 wherein purified amine is recovered overhead via line 127. The bottom from the second distillation zone is essentially high-boiling solvent and is recycled via line 107 to the extraction zone. Both distillation zones are operated under reflux conditions (reflux streams for distillation zone 125 is not shown).

Another embodiment of this invention is illustrated in FIGURE 4. In this embodiment the amine to be recovered forms a maximum boiling azeotrope with water. The solvent in this embodiment does not form an azeotrope with water.

Referring now specifically to FIGURE 4, the aqueous solution of the amine is introduced through lines 201 and 201a into an extraction zone 203 wherein the aqueous solution of the amine is countercurrently contacted with the solvent which is introduced into the extraction zone through line 205. The raffinate from the extraction zone which is primarily water is withdrawn through line 209 and is discarded. The extract from the extraction zone which consists essentially of the solvent, amine and water, is withdrawn through line 211 and is introduced into a distillation zone 213 wherein the extract is subjected to fractional distillation. Purified amine is recovered overhead from this distillation zone and the bottoms which consist essentially of the solvent, amine and some water, is withdrawn through line 217 and is introduced into a second distillation zone 219 wherein this bottoms stream is subjected to fractional distillative operation. An amine-water maximum boiling azeotrope is recovered as an overhead stream of the second distillation zone which is withdrawn through line 221. This azeotrope is returned to the extraction zone by joining line 201 carrying the aqueous amine solution. The bottoms from the second distillation zone consist essentially of the solvent and is recycled via line 205 to the extraction zone.

Once again the initial operation and start-up of the extraction zone is similar to the operations described in connection with FIGURES 2 and 3. Furthermore, both distillation steps are effected under reflux conditions (reflux lines 215a and 221a).

There are still other variations which are not diagrammatically illustrated herein but which nevertheless are within the scope of this invention. For example, the amine can form a minimum-boiling azeotrope with water and the solvent either does not form an azeotrope with water or forms a binary azeotrope with water which is higher boiling than the amine-water azeotrope. In such instance, the amine-water azeotrope is removed overhead in a first distillation zone and is condensed and recycled to the extraction zone. The bottoms from the first distillation zone is subjected to distillative operation in a second distillation zone to recover purified amine.

In still another variation of this invention there is no azeotrope formation between the amine and water and/or the solvent and water. In this case the extract from the extraction zone consists of the amine, the solvent and water. The water is distilled off in a first distillation zone and the remaining solvent-amine stream is subjected to a second distillative operation whereby purified amine is recovered.

The process of this invention can be effected in a batchwise or continuous phase although continuous operation is obviously preferred for most industrial operations. The extraction can be carried out in conventional extraction columns such as a packed column, a rotating disc contractor and the like. Similarly, the distillation operations can be effected in ordinary distillation columns.

The solvent-to-feed ratios in the extraction zone can vary over a relatively wide range. This is readily appreciated by those skilled in the art. The relative amounts of solvent and feed depend upon such factors as the concentration of the amine in the feed stream, the percentage recovery which is desired, the capacity of the equipment which is employed as well as other similar considerations. Thus the solvent-to-feed ratios may be as high as 20:1 (on a volume basis) and as low as about 0.1:1. Care should be exercised however to assure that the solvent-to-feed ratio is not so high as to result in a ternary system within the extraction zone which does not fall within the two-phase region on the ternary miscibility diagram for the particular extraction system.

The novel process is eminently suitable to recover the amine present in the aqueous solutions in a wide range of concentrations. By proper choice of solvent and other extraction and distillation conditions, the instant process may be adapted to recover an amine from aqueous solutions wherein the concentration of the amine in the aqueous solution is as high as about 70 weight percent.

It is also within the scope of this invention to modify the selective solvent by the addition of so-called anti-solvents which are liquid organic compounds used in small amounts to decrease the solubility of water in the solvent thus resulting in a higher purity amine product. Concurrently the anti-solvents usually reduce the capacity of the solvent for the amine, consequently requiring the use of more solvent to obtain the same percentage recovery. Therefore, the selection of the proper anti-solvent must be based upon the consideration of the solvent which is used.

The aqueous amine feed solutions sometimes contain inorganic water soluble materials as impurities. The presence of the materials does not obstruct the operation of the instant process. In fact, at times these inorganic water soluble salts may be deliberately added to the feed stream to increase the efficiency of the selective solvent. Their presence does not contaminate the recovered amine. After the extraction the major portion of the salt leaves the system in the raffinate stream although a small amount of salt is present in the extract stream from the extractor. Upon the distillation of the amine from the extract, the salt precipitates and the solvent residue can be removed therefrom by filtration, by extraction with water or by any other suitable method before the solvent is returned to the system.

In the following examples, the experimental procedure employed was the same. Only process variables were varied such as the feed, solvent, temperature, solvent-to-feed ratio, etc. The aqueous solution of amine was charged to a separatory funnel together with the solvent. The mixture was thoroughly shaken several times at the extraction temperature and then allowed to settle. The lower raffinate phase consisted mainly of water and was discarded. The extract phase containing the amine was charged to a laboratory scale distillation column 1 inch in diameter and 4 feet long, packed with ⅛ inch glass helices. The distillation column was also equipped with an overhead condenser and a receiver. Successive cuts were taken overhead at different temperatures. All the percentages and ratios in the examples are on weight basis unless otherwise indicated.

EXAMPLE 1

The following table shows that the capacity of the selective solvents for morpholine increases with increasing temperature. In addition, further unexpected benefit is derived from the increased temperature since it has been found that the percent of morpholine on a solvent-free basis is increased, i.e., the proportional amounts of morpholine to water in the extract is increased. Furthermore, the solubility of the solvents in water does not increase appreciably. The following data were obtained by mixing a 30 volume percent aqueous solution of morpholine with a volumetric equivalent of solvents. Data were taken after apparent equilibrium was reached.

| Solvent | Temp. (° C.) | Percent morpholine in solvent extract | Percent of morpholine in solvent extract on s solvent-free basis (percent) | Percent of solvent in water raffinate |
|---|---|---|---|---|
| m-Xylene | 25 | 1.3 | 89 | <0.1 |
|  | 60 | 2.4 | 89 | 0.1 |
| 2-ethyl-hexanol | 25 | 8.5 | 72 | 0.1 |
|  | 60 | 10.5 | 69 | 0.2 |
|  | 85 | 12.5 | 72 | 0.2 |
|  | 130 | 17.9 | 64 | 0.6 |
| 90% 2-ethylhexanol, 10% decane. | 130 | 11.1 | 66.5 |  |
| 4-methyl-2-pentyl acetate. | 25 | 1.3 | 57 | 0.2 |
|  | 60 | 3.0 | 78 | 0.2 |

All percentages are on a volumetric basis.

EXAMPLE 2

An extract obtained by the countercurrent extraction at 85° C. of one volumetric equivalent of an 18.5 volume percent aqueous morpholine feed with three volumetric equivalents of 2-ethylhexanol was distilled batchwise in a laboratory-scale distillation column at atmospheric pressure to remove the water and recover the morpholine contained therein. The extract contained 4.3 volume percent water, 6.6 volume percent morpholine and 89.1 volume percent 2-ethylhexanol. An external reflux ratio of about 3 to 1 was employed. The initial temperature at the head was 99.1° C., the boiling point of the 2-ethyl-hexanol-water heterogeneous azetrope. The two-phase azeotrope was removed and amounted to 5.08 volume percent of the charge and was all removed between 99.1° C. and 103° C. This distillate contained 0.3 volume percent morpholine. The morpholine was then distilled from the remaining 2-ethylhexanol at a temperature between 103° C. and 132° C., the boiling point of pure morpholine is 128.3° C., and 6.54 volume percent of the initial charge was recovered. This cut contained 99.0 volume percent morpholine. The distillation was then stopped and the pot residue was analyzed for morpholine. The morpholine contained in the residue was 0.02 volume percent of the residue. The recovery of morpholine in the second distillate was therefore 99 volume percent of that in the initial charge.

EXAMPLE 3

The aqueous solution of the amine consisted of 18.15 percent monoethanolamine and 81.85 percent water and the solvent consisted of 9.2 percent benzene and 90.8 percent dodecyl phenol. The ratio of solvent-to-feed in the extraction funnel was 0.862:1 and the temperature of the mixture was 212° F. The extract consisted of 5.1 percent monoethanolamine, 4.7 percent water and the remainder was the solvent.

In the distillation step, a benzene-water azeotrope was removed as a first fraction at 26.5 to 26.8° C. overhead temperature, followed by a second fraction (water) at an overhead temperature of 50–60° C., an intermediate fraction at an overhead temperature of 105–106° C. and finally monoethanolamine at an overhead temperature of 106° C. The distillation was conducted at a reflux ratio of 2:1 and 132 mm. Hg pressure.

The yield of monoethanolamine from the distillation step was 99.6 percent and its refractive index was 1.4533 as compared to a refractive index of 1.4544 for pure monoethanolamine thus indicating a substantially pure product.

EXAMPLE 4

The aqueous solution of the amine consisted of 8.6 percent ethylenediamine and 91.4 percent water. The solvent consisted of 9.4 percent benzene and 90.6 percent nonyl phenol. The solvent-to-feed ratio in the extraction funnel was 0.85:1 and the extraction temperature was 200° F. The extract consisted of 4.02 percent water, 6.78 percent ethylenediamine and the remainder was solvent.

The first distillate fraction was a benzene-water azeotrope and was removed at an overhead temperature of 69.4° C. and at atmospheric pressure. Ethylenediamine was then removed at an overhead temperature of 72° C. and at a distillation pressure of 144.5 mm. Hg. It had a refractive index of 1.4568 as compared to a refractive index of 1.4564 for pure ethylene-diamine. The yield of the amine was 99.5 percent and the reflux ratio during distillation was 3:1. The purity of the amine was 97.4 weight percent.

EXAMPLE 5

The aqueous feed solution consisted of 9.15 percent diethylene triamine and 90.85 percent water. The solvent consisted of 15.7 percent n-heptane and 84.3 percent dodecylphenol. The solvent-to-feed ratio was 0.796:1 and the extraction temperature was 250° F. The extract consisted of 4.08 percent diethylene-triamine, 5.96 percent water and the remainder was solvent.

The first distillate fraction was a heptane-water azeotrope and was removed at 78.5° C. overhead temperature and 770 mm. Hg pressure. Diethylenetriamine was then recovered at an overhead temperature of 150–158° C. and a pressure of 143 mm. Hg. Its refractive index was 1.4816 as compared to a refractive index of 1.4830 for the pure amine. The yield of diethylenetriamine from the distillation was 94.7 percent. During the removal of heptane-water azeotrope all the heptane was refluxed to the distillation column and the reflux ratio during the removal of the amine was 2:1.

EXAMPLE 6

The aqueous feed solution in this instance consisted of 9.46 percent morpholine and 90.54 percent water. The solvent consisted of 19.0 percent benzene and 81.0 percent nonylphenol. The solvent-to-feed ratio was 0.875:1 and the extraction temperature was 250° F. The extract contained 6.37 percent morpholine, 6.68 percent water and the remainder was the solvent.

The first cut in the distillation was a benzene-water azeotrope which was distilled at an overhead temperature of 68.3–79.0° C. at 759 mm. Hg. The morpholine cut was removed at an overhead temperature of 70.2–72.5° C. and a pressure of 102 mm. Hg. The yield of morpholine from the distillation operation was 99.2 percent and its refractive index was 1.4544 as compared to a refractive index of 1.4542 for pure morpholine. The reflux ratio was varied between 3:1 and 2:1. All of the benzene was refluxed to the distillation column during the removal of benzene-water azeotrope and the reflux ratio of 2:1 was maintained during the removal of morpholine.

EXAMPLE 7

The aqueous feed solution consisted of 31.6% N-methyl morpholine and 68.4% water. The solvent was α-methyl naphthalene, the solvent-to-feed ratio was 0.728:1 and the extraction temperature was 77° F. The extract consisted of 6.53% N-methyl morpholine, 0.73% water and the remainder was α-methyl naphthalene. The first distillation cut was an azeotrope of N-methyl morpholine and water which was removed at an overhead temperature of 94.2–95.5° C. and a 2:1 reflux ratio. N-methyl morpholine was thereafter recovered at an overhead temperature of 114.5 to 115.0° C. and a reflux ratio of 2:1 in 99.3% yield. The distillation was effected at 760 mm. Hg pressure. The refractive index of the recovered N-methyl morpholine was 1.4348 as compared to 1.4352 for pure N-methyl morpholine.

EXAMPLE 8

The feed solution of Example 6 was extracted with dodecanol at 77° C. and a solvent-to-feed ratio of 0.57:1. The extract consisted of 13.4% N-methyl morpholine, 3.80% water and the remainder was the solvent.

An azeotrope of water and N-methyl morpholine was removed as the first distillation cut at an overhead temperature of 94.2° C., a reflux ratio of 3:1 and a pressure of 759 mm. Hg. N-methyl morpholine was recovered at an overhead temperature of 114.0° C. to 114.5° C., a reflux ratio of 3:1 and a pressure of 756 mm. Hg. The yield of the amine was 94.6% and its refractive index was 1.4345.

EXAMPLE 9

The aqueous solution of Example 8 was extracted with a solvent consisting of 50.7% benzene and 49.3% dodecylphenol at 77° F. The solvent-to-feed ratio was 0.61:1 and the extract consisted of 16.10% N-methyl morpholine, 0.82% water and the remainder was solvent.

The first cut in the distillation was a benzene-water azeotrope which was removed at an overhead temperature of 69.0 to 79.0° C., a reflux ratio of 1:1 and a pressure of 772 mm. Hg. N-methyl morpholine was recovered at an overhead temperature of 56–56.8° C., a reflux ratio of 2:1 and a pressure of 103 mm. Hg. The yield of the amine was 99.0% and its refractive index was determined to be 1.4352.

EXAMPLE 10

The aqueous feed solution in this example consisted of 31.6% 2,6-dimethyl morpholine and 68.4% water. This solution was extracted with α-methyl naphthalene (solvent) at 25° C. and solvent-to-feed ratio of 0.698:1. The extract consisted of 4.34% 2,6-dimethyl morpholine and 0.24% water, the remainder being the solvent.

The extract was subjected to distillation. An azeotrope of 2,6-dimethyl morpholine and water was removed overhead at 99.8° C. and 770 mm. Hg pressure while maintaining a reflux ratio of 4:1. 2,6-dimethyl morpholine was then recovered at an overhead temperature of 146.8–148° C., 769 mm. Hg pressure and a 2:1 reflux ratio. The yield of 2,6-dimethyl morpholine was 99.7% and its refractive index was 1.4460 as compared to 1.4462 for pure 2,6-dimethyl morpholine.

EXAMPLE 11

The feed solution consisted of 37.1% 2,6-dimethyl morpholine and 62.9% water. The solvent was 2,6,8-trimethyl-4-nonanol. The extraction step was carried out at 25° C. and at a solvent-to-feed ratio of 0.556:1. The extract contained 9.19% 2,6-dimethyl morpholine, 1.84% water and the remainder was solvent.

The extract was distilled first to remove an azeotrope of 2,6-dimethyl morpholine, water and the alcohol (2,6,8-trimethyl-4-nonanol) at an overhead temperature of 98.5–110° C. and 762 mm. Hg pressure while maintaining a 3:1 reflux ratio. 2,6-dimethyl morpholine was then recovered at 148–164° C., 762 mm. Hg pressure and a 2:1 reflux ratio. The refractive index of the recovered 2,6-dimethyl morpholine was 1.4460 and the yield was 99.9%.

EXAMPLE 12

The feed solution in this example consisted of 31.6% 2,6-dimethyl morpholine and 68.4% water. It was extracted with a solvent consisting of 50.7% benzene and 49.3% dodecylphenol. The extraction was carried out at 25° C. and a solvent-to-feed ratio of 0.61:1. The extract consisted of 16.59% 2,6-dimethyl morpholine, 0.893% water and the remainder was the solvent.

The extract was distilled first to remove a benzene-water azeotrope at 762 mm. Hg pressure, an overhead temperature of 69.2–79.8° C. and a reflux rattio of 2:1. 2,6-dimethyl morpholine was removed at an overhead temperature of 87.4–88.8° C., a pressure of 107 mm. Hg and a reflux ratio of 2:1. The refractive index of the recovered 2,6-dimethyl morpholine was 1.4461 and the yield was 99.4%.

EXAMPLE 13

A feed solution consisting of 17.8% pyridine and 82.2% water was extracted at 25° C. with α-methyl naphthalene using a solvent-to-feed ratio of 0.822:1. The extract contained 11.86% pyridine, 0.86% water and the remainder was solvent. This extract was distilled at 767 mm. Hg pressure. A pyridine-water azeotrope was removed at an overhead temperature of 93.8–114.3° C. and a reflux ratio of 4:1 followed by the removal of a heart cut (pyridine) at 114.3–115.2° C. and a 3:1 reflux ratio.

The refractive index of the recovered pyridine was 1.5093 as compared to a refractive index of 1.5099 for pure pyridine. The yield of pyridine was 98.5%.

EXAMPLE 14

The feed solution in this example consisted of 37.4% pyridine and 62.6% water. It was extracted at 26° C. with 2-ethylhexanol at a solvent-to-feed ratio of 0.762:1. The extract which consisted of 28.5% pyridine, 7.49% water, and the remainder 2-ethylhexanol, was distilled at a pressure of 755.2 mm. Hg. A pyridine-water azeotrope was first removed at an overhead temperature of 93.2–95.0° C. and a 4:1 reflux ratio. The heart cut (pyridine) was distilled at an overhead temperature 113.0–120.0° C. and a reflux ratio of 2:1.

The yield of pyridine was 99.9% and its refractive index was determined to be 1.5083.

EXAMPLE 15

The feed solution once again was an aqueous solution of pyridine having the same composition as the feed solution of Example 13. It was extracted at 25° C. using a solvent consisting of 50.7% benzene and 49.3% dodecylphenol. The solvent-to-feed ratio in the extraction step was 0.735:1.

The extract which contained 17.02% pyridine, 0.78 water and 82.20% solvent was first distilled at 773 mm. Hg and a 2:1 reflux ratio to remove a benzene-water azeotrope at an overhead temperature of 68.3–79.8° C. The heart cut (pyridine) was then distilled at 107 mm. Hg pressure, 58.3–59.5° C. overhead temperature and a 1:1 reflux ratio. The yield of pyridine was 99.9% and its refractive index 1.5090.

EXAMPLE 16

An aqueous solution of 36.8% nicotine (the remainder being all water was extracted at 25° C. with the same solvent as in Example 15. The extract was found to contain 32.36% nicotine, 1.69% water and the rest was the solvent. This was distilled first at 769 mm. Hg pressure at total benzene reflux and then a benzene-water azeotrope was removed at 69.2° C. overhead temperature. The nicotine was then distilled off at 149.3° C. overhead temperature and 48 mm. Hg pressure.

The yield of nicotine was 92.3% and its refractive index was 1.5238 as compared to a refractive index of 1.5233 for pure nicotine.

EXAMPLE 17

The feed solution in this example consisted of 33.3% hydrazine and 66.7% water. It was extracted at 25° C. with a solvent consisting of 75.8% dodecyl phenol and 24.2% hexane using a solvent-to-feed ratio of 0.57:1. The extract contained 4.30% hydrazine, 2.15% water and the remainder was solvent.

The extract was distilled at 754 mm. Hg and a 3:1 reflux ratio to first remove a ternary azeotrope consisting of water-hydrazine and hexane at an overhead temperature of 62.8° C. This was followed by the removal of hexane-hydrazine azeotrope first at 754 mm. Hg pressure, 2:1 reflux ratio and 65° C. overhead temperature and thereafter at a reduced pressure of 131 mm. Hg, 1:1 reflux ratio and overhead temperature of 20.0° C. Finally, hydrazine was distilled off at 130 mm. Hg pressure, 1.5:1 reflux ratio and an overhead temperature of 67.3–70.0° C.

The yield of hydrazine was 99.6% and its refractive index was 1.4694 as compared to a refractive index of 1.4701 for pure amine.

It should be pointed out that in some instances where the amine and water form a homogeneous azeotrope it is possible to recover the amine in high purity by judicious selection and adjustments of some of the operating parameters such as the solvent composition, solvent-to-feed ratio. etc. Under these conditions, an amine-water azeotrope is removed in the first distillation of the extract and high purity amine is removed as distillate in the second distillation. A low-boiling solvent can be employed in the extraction zone if desired. In this case, the low-boiling solvent would form a minimum-boiling, heterogeneous azeotrope with water. Thus water can be distilled from the extract as the low-boiling solvent-water azeotrope or the low-boiling solvent-water-amine ternary azeotrope. The distillate is condensed and the water phase is either discarded or recycled to the extraction zone, if desired. The low-boiling solvent is partly refluxed to the distillation zone and the remainder recycled to the extraction zone.

There are other amines, however, that form homogeneous azeotropes with water and which are difficult to recover in high purity by mere adjustment of operating parameters. The use of low-boiling solvents in this case is preferable and in fact essential to the recovery of high purity amines. The operation involving the use of low-boiling solvents is generally as illustrated in FIGURE 3. In these cases the amine-water homogeneous azeotrope contains less than about 25 weight percent water and the amine can be recovered in high purity, i.e., at least 95% or more. Examples of such amines are ethylene-diamine and n-butylamine. The former, for example, forms a maximum-boiling homogeneous azeotrope with water boiling at 119.0° C. and containing 18.4 weight percent water.

The low-boiling solvents, as was previously mentioned, can be any saturated aliphatic or any aromatic compound such as those defined in conjunction with the description of the high-boiling solvent. These low-boiling solvents must be miscible with both the amine and the high boiling solvent, capable of forming an azeotrope with water and have a lower boiling point than the amine to be recovered.

What is claimed is:

1. A process which comprises contacting in an extraction zone an aqueous solution of an amino group containing compound having a distribution coefficient of at least about 1/20 with an organic solvent at a temperature of from about 25° C. to about 300° C., said solvent being generally substantially immiscible with water, inert to said amino group-containing compound, incapable of forming a binary azeotrope with said amino group-containing compound under said extraction conditions and having a boiling point higher than said amino group-containing compound, withdrawing from the extraction zone an extract containing said amino group-containing compound, said solvent and some water, subjecting said extract to distillative operation to remove the water and to recover purified amino group-containing compound.

2. The process of claim 1 wherein said amino group-containing compound has a distribution coefficient of at least about 1/10.

3. The process of claim 1 wherein said amino group-containing compound is amorpholine.

4. The process of claim 1 wherein said amino group-containing compound is selected from the group consisting of primary amines, secondary amines and tertiary amines represented, respectively, by the general formulae:

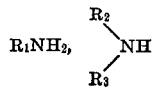

and

wherein $R_1$, $R_2$, $R_3$, $R_4$ and $R_5$ are alkyl groups containing 1 to 5 carbon atoms.

5. The process of claim 1 wherein said solvent is a saturated aliphatic alcohol.

6. The process of claim 1 wherein said solvent is 2-ethylhexanol.

7. The process of claim 1 wherein said solvent is a saturated aliphatic hydrocarbon.

8. The process of claim 1 wherein said solvent is an alkyl alkanoate.

9. The process of claim 1 wherein said solvent is 4-methyl-2-pentyl acetate.

10. The process of claim 1 wherein said solvent is an alkyl-substituted benzene.

11. The process of claim 1 wherein said solvent is xylene.

12. The process of claim 1 wherein said solvent is a halogenated aliphatic hydrocarbon.

13. The process of claim 1 wherein said solvent is a halogenated aromatic hydrocarbon.

14. The process of claim 1 wherein said solvent is chlorobenzene.

15. The process of claim 1 wherein said solvent is an aromatic alcohol.

16. The process of claim 1 wherein said solvent is an alkyl-substituted phenol.

17. The process of claim 1 wherein said distillative operation is effected at a temperature of from about 25° C. to about 300° C.

18. The process of claim 1 wherein said distillative operation is effected at a temperature of from about 25° C. to about 300° C. and a pressure of from about 0 millimeter of mercury absolute to about 760 millimeters of mercury absolute.

19. The process of claim 1 wherein said distillative operation is effected at a temperature of from about 25° C. to about 300° C. and a pressure of from about 10 millimeters of mercury absolute to about 250 millimeters of mercury absolute.

20. A process which comprises admixing an aqueous solution containing at least about 60 percent by weight of a morpholine with an inert, substantially water immiscible organic solvent which has a boiling point higher than said morpholine, is nonazeotropic with said morpholine and is capable of forming a minimum boiling heterogeneous azeotrope with water; said solvent being present in admixture with said aqueous solution in an amount sufficient to form a minimum boiling heterogeneous azeotrope with all the water in said aqueous solution; distilling said admixture and removing said heterogeneous azeotrope as distillate.

21. A process which comprises admixing an aqueous solution containing at least about 60 percent by weight of a morpholine with 2-ethylhexanol; said 2-ethylhexanol being present in admixture with said aqueous solution in an amount sufficient to form a minimum boiling heterogeneous azeotrope with all the water in said aqueous solution; distilling said mixture and removing said heterogeneous azeotrope as distillate.

22. A process which comprises contacting in an extraction zone an aqueous solution of ethylenediamine with a high-boiling organic solvent and a low-boiling organic solvent, at a temperature of from about 25° C. to about 300° C., said high-boiling solvent being generally substantially immiscible with water, inert to said ethylenediamine, incapable of forming a binary azeotrope with said ethylenediamine under said extraction conditions and having a higher boiling point than said ethylenediamine, said low-boiling solvent being generally miscible with said ethylenediamine and said high-boiling solvent, capable of forming an azeotrope with water and having a lower boiling point than said ethylenediamine, withdrawing an extract from said extraction zone containing said high-boiling solvent, said low-boiling solvent, the ethylenediamine and water, distilling said extract in a first distillation zone to recover a distillate consisting essentially of water and said low-boiling solvent and bottoms consisting essentially of amine and said high-boiling solvent and subjecting said bottoms to distillative operation in a second distillation zone to recover high purity ethylenediamine as distillate.

23. The process of claim 22 wherein said high-boiling solvent is nonyl phenol and said low-boiling solvent is benzene.

References Cited

UNITED STATES PATENTS

| | | | |
|---|---|---|---|
| 2,695,867 | 11/1954 | Chambers | 203—14 |
| 2,698,286 | 12/1954 | Bircher | 203—63 |
| 2,776,972 | 1/1957 | Laemmle | 260—247 |
| 2,900,310 | 8/1959 | Ottenheym | 203—69 |
| 2,969,375 | 1/1961 | Ney | 203—69 |
| 3,055,809 | 9/1962 | Lichenwaller | 203—14 |
| 3,087,928 | 4/1963 | Godfrey | 260—247 |
| 3,321,284 | 5/1967 | Dunlop | 203—63 |

WILBUR L. BASCOMB, Jr., *Primary Examiner.*

U.S. Cl. X.R.

260—576, 577, 582, 583; 203—63, 70, 60, 69, 62, 67, 65, 59, 61, 51, 52, 14, 71